United States Patent [19]
Carson

[11] Patent Number: 5,768,928
[45] Date of Patent: Jun. 23, 1998

[54] METHOD OF MAKING AN HYDRAULICALLY EFFICIENT RIBBED PIPE

[76] Inventor: Ken Carson, 111 E. 100th Ave., Anchorage, Ak. 99515

[21] Appl. No.: 870,097

[22] Filed: Jun. 5, 1997

Related U.S. Application Data

[62] Division of Ser. No. 543,757, Oct. 16, 1995.

[51] Int. Cl.[6] ................................................ B21C 37/12
[52] U.S. Cl. .............................................. 72/49; 138/154
[58] Field of Search ................................. 72/49, 50, 51, 72/52, 367.1, 368, 370.19, 180, 178; 138/150, 154, 134, 129

[56] References Cited

U.S. PATENT DOCUMENTS 3,604,464  9/1971  Pelley ........................................... 72/49
3,606,779  9/1971  Parma .......................................... 72/49
3,606,783  9/1971  Lewis ........................................... 72/49
3,621,884  11/1971 Trihey ......................................... 72/49

*Primary Examiner*—Lowell A. Larson
*Assistant Examiner*—Rodney Butler
*Attorney, Agent, or Firm*—Flehr Hohbach Test Albritton & Herbert LLP

[57] ABSTRACT

A pipe formed from a continuous, cold rolled, lock seam quality, sheet steel, having a spiral rib. The pipe may be protected by an abrasion or corrosion resistant coating. The pipe is normally used for storm drains, culverts, sewer lines or HVAC. A closed spiral rib formed in the pipe wall adds strength to the wall, while maintaining a smooth inner wall that promotes exceptionally good fluid flow. The pipe has a smooth interior surface with outwardly projecting structural ribs of helical configuration throughout the length of the pipe.

10 Claims, 12 Drawing Sheets

FIG. 3
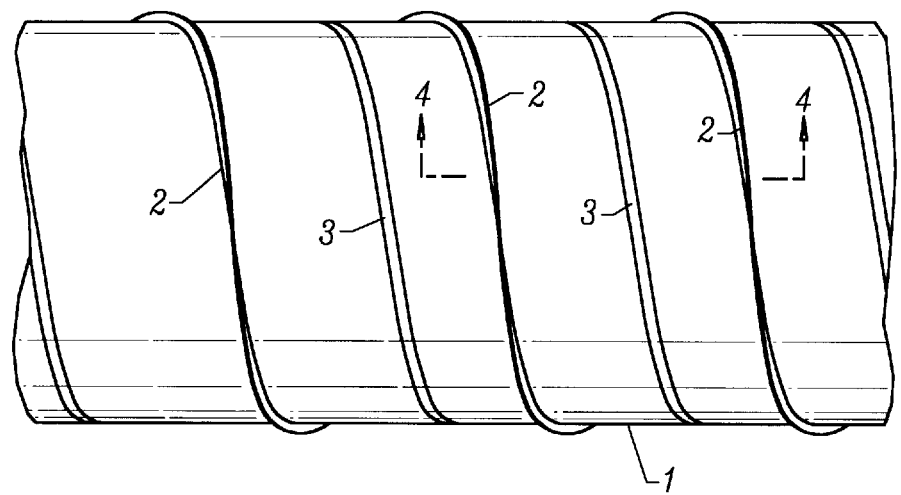
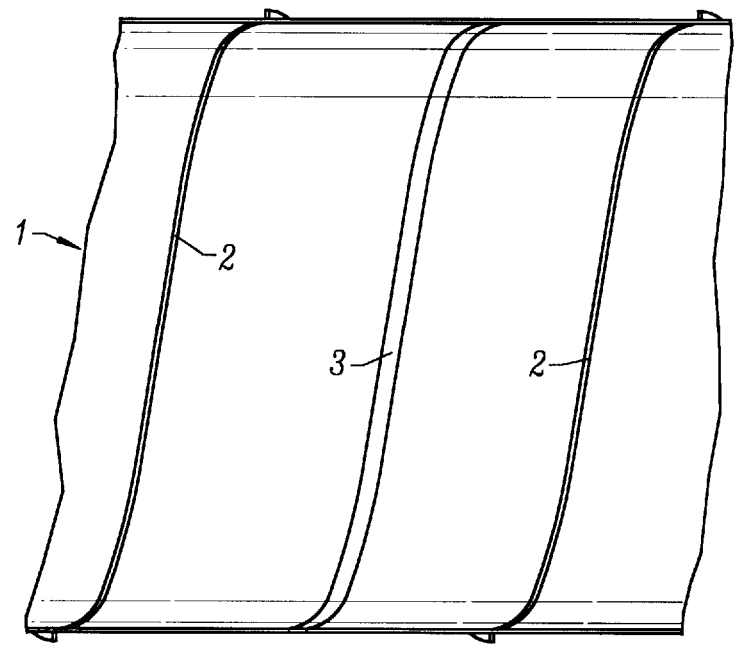
FIG. 4

Direction of travel

Direction of travel

Direction of travel

Direction
of
travel

Direction of travel

METHOD OF MAKING AN HYDRAULICALLY EFFICIENT RIBBED PIPE

This is a division of application Ser. No. 08/543,757, filed on Oct. 16, 1995.

This invention relates to hydraulically efficient ribbed pipe and particularly to hydraulically efficient ribbed pipe having closed ribs, and the method of making thereof.

BACKGROUND OF THE INVENTION

Corrugated pipe has been used for many years in culvert and other storm drain type applications. However, corrugated pipe is inefficient because it does not have a smooth inner surface. To achieve more efficient operation and to improve flow, smooth wall pipes, made from concrete or plastic, are used. Plastic pipe is expensive in the larger sizes, has strength problems, and must be properly supported. Concrete pipe is heavy, making installation difficult. Moreover, concrete has problems due to corrosion, depending on the type of liquid being transported.

To overcome these problems, steel pipe is now being manufactured. To achieve proper strength requirements and keep the weight down to reasonable levels, the pipe is typically made from flat sheets that are rolled into a spiral form (typically helical). The spiral pipe is joined by welding or by using a crimp-type lock seam. To increase strength, a rib is typically formed at a point intermediate to the lock seam. Typically, this rib is formed by a die type press. Such construction creates open type ribs. Examples of this type of pipe are found in U.S. Pat. Nos. 4,630,650 to Davis and 4,838,317 to Andre at al. The Davis structure forms either a triangular rib or a "U" shaped rib on one side of the sheet of steel. The opposite side of the sheet is formed with an interlocking fold. As the pipe is rolled into the spiral, the interlocking fold interlocks with a corresponding fold on the rib. Once interlocked, the folds can be crimped to lock the seam. The Andre et al patent teaches a number of open or semi open rib designs. In most cases, these rib designs are formed by rolling the sheet of steel over appropriate dies. Andre et al. teaches the use of semi-closed ribs that can act to secure lining materials to the inner pipe wall Surface. Andre et al. teach that ordinary liners have difficulty in adhering to pipe walls. Such linings, as shown in the Andre et al. patent include plastics and concrete liners. Andre et al. also teaches formation of a triangular type rib that is formed by bending the wall upward and outward, forming a "V" shaped channel that is open at the top. A cap is placed over this channel and is crimped into place.

Open rib designs are easy to manufacture. However, an unlined ribbed pipe presents some hydraulic inefficiency. Moreover, the open ribs can become a breeding ground for bacteria. Finally, the size of the ribs in the Andre et al design is relatively small. Attempting to use the ribs as a means to hold a liner is tenuous. The process of forming complex interlocking rib designs is also expensive and time consuming.

SUMMARY OF THE INVENTION

The instant invention is a helically spiraled pipe that has a raised rib design. Unlike the other ribbed spiral pipes, however, the ribs on this pipe are completely closed. Common practice in the pipe making art has required that the ribs be kept open so that a die can be placed into the open rib channel to support the wall as it is rolled into the helical radius. Forming a closed rib can be accomplished by supporting the rib on the outside of the pipe wall (to keep the rib close to perpendicular to the axis of the pipe) as the pipe is being rolled. This is accomplished with a slotted roller or mandrel. The maximum rib depth is determined by the pipe diameter (the larger the diameter the larger the possible rib depth).

This pipe is intended for use in storm sewers, culverts, sanitary sewers, and other low head applications. The instant invention is much stronger than plastic, but has the same resistance to corrosion when fabricated with polymer coated steel. Another advantage of this pipe is that is well suited for installations where ground conditions promote settling or experience other ground movements. The present invention is more rigid than pipes such as corrugated plastic, so it will bridge weak soil conditions better than plastic; yet, the pipe is light so it does not settle into weak soil conditions such as concrete pipe, which requires special bedding in bad soil conditions.

The pipe is formed from flat steel sheets that are rolled. In one embodiment, a lock seam, common on HVAC ductwork is used to close the sections of pipe. The advantage of this type seam is that it is flat on the inside of the pipe wall, which does not restrict the flow within the pipe. An alternative to the lock seam is a weld seam, where the seam is welded together.

A unique aspect of this pipe is the method of construction. The objective is to form a number of external flanges in the wall of a pipe having a smooth interior wall. The pipe is made from a coiled, galvanized coated, or plain sheet of steel. Like many common types of rolled pipes, the edges of the steel sheet are formed and joined into a lock seam after the sheet passes through a curving roll at a helix angle to form the pipe. Unlike present practice, this invention uses forming rolls to create flanges on the outer wall of the pipe by drawing the wall material together. This is unlike the process of forming a corrugation, or a rib using a forming roll on the inside wall of the pipe. To form a closed rib, the interior wall must have nothing lying in the rib, so that it can be completely closed with reasonable square shoulders.

It is an object of this invention to produce a spiral ribbed pipe that is lightweight yet strong.

It is yet another object of this invention to produce a spiral ribbed pipe that has closed ribs, which add strength, but do not create possible bacteria breeding surfaces.

It is a further object of this invention to produce a spiral ribbed pipe that can be used in weak soil conditions.

BRIEF DESCRIPTION OF THE DRAWINGS

FIG. 3 is an external side view of a length of single rib pipe constructed according to the present invention.

FIG. 4 is an internal sectional view taken along the lines 4—4 in FIG. 3.

DETAILED DESCRIPTION OF THE INVENTION

Figure 1:
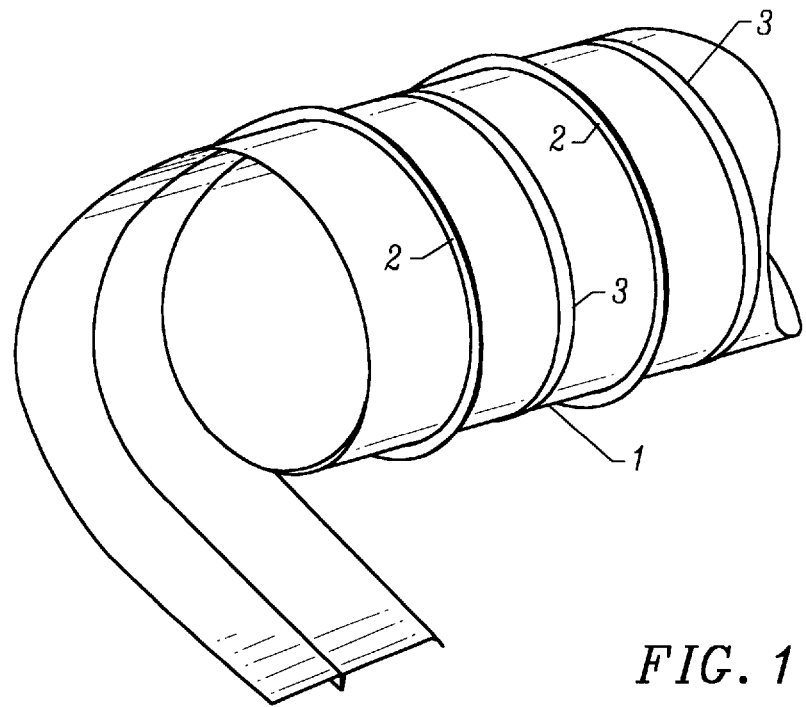
FIG. 1 is a perspective view of the preferred embodiment of the invention in a single rib, spiral ribbed pipe.
Figure 2:
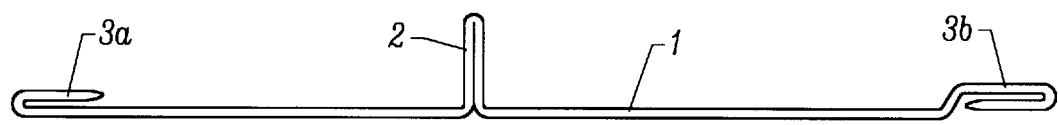
FIG. 2 is an enlarged section view of one segment of single rib pipe.
Figure 5:
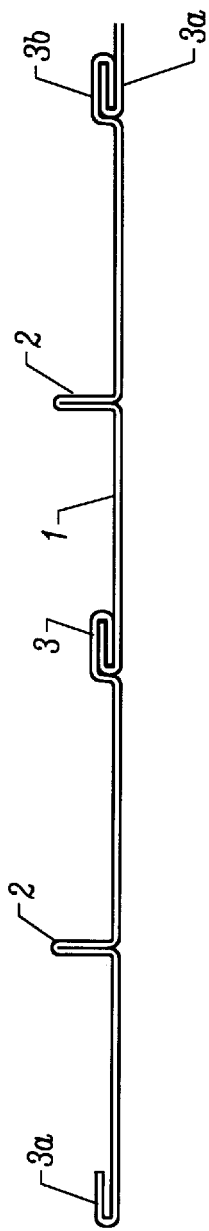
FIG. 5 is an enlarged section view of two interlocked sections of single ribbed pipe.

Referring now to FIGS. 1–4, a single ribbed length of helical pipe 1 is shown. FIG. 1 shows the pipe 1 in a perspective view. In this embodiment, a single rib 2 is shown. A lock seam 3 is used to secure the pipe 1 together during the construction process. Typically a flat sheet of steel is used in this process. The sheet is normally 27 inches wide. During the single-rib process, the formation reduces the width of the steel sheet to approximately 21 inches, depending on the rib size. FIG. 2 shows a section of the sheet having been passed through a series of forming rolls in a ten-stand roll former. FIG. 2 shows the two parts of the lock seam 3a and 3b and the single rib 2. FIG. 3 shows a side view of the pipe 1. Here again are the rib 2 and the lock seam in a helical pattern. FIG. 4 shows an internal section view of the single-rib pipe 1. Here, the rib 2 and the lock seam 3 are shown. FIG. 5 shows a section view of two lengths of pipe 1 that have been joined at the center lock seam. Here again, rib 2 and the seams 3a and 3b are shown.

Figure 6:
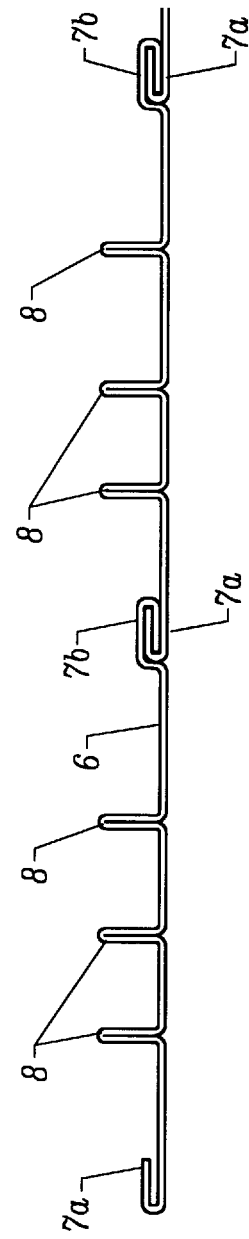
FIG. 6 is an enlarged section view of two interlocked sections of triple ribbed pipe.
Figure 7:
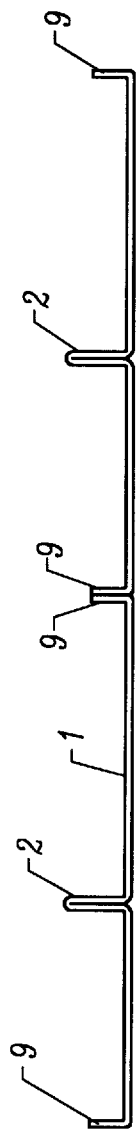
FIG. 7 is an enlarged section view of two connected sections of single ribbed pipe, using a weld seam.
Figure 8:
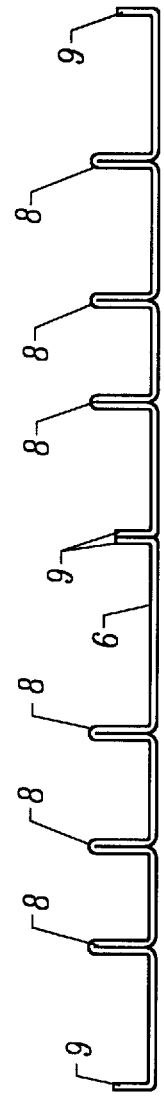
FIG. 8 is an enlarged section view of two connected sections of triple ribbed pipe, using a weld seam.

FIG. 6 shows a section view of two lengths of triple-ribbed pipe 6. Here, the lock seams 7a and 7b are shown along with triple-ribs 8. FIGS. 7 and 8 show section views of single-rib pipe 1 and three-rib pipe 6 that have a weld seam 9. Details of the weld seam 9 are discussed in greater detail below.

Figure 9:
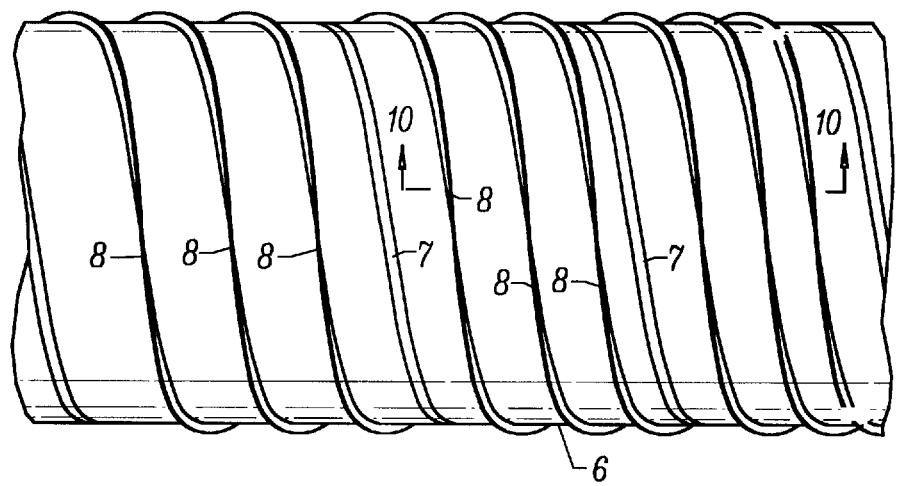
FIG. 9 an external side view of a length of triple rib pipe constructed according to the present invention.
Figure 10:
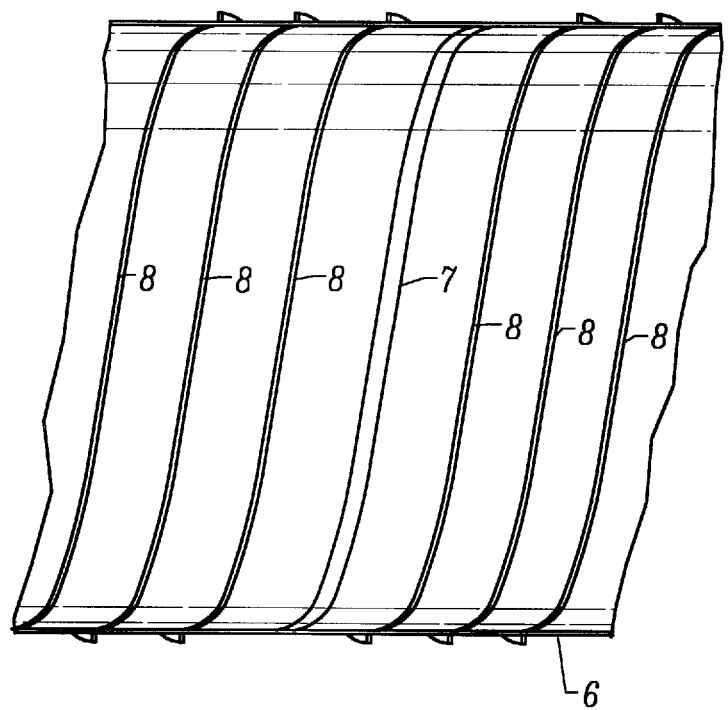
FIG. 10 is an internal sectional view taken along the lines 10—10 in FIG. 7.
Figure 13:
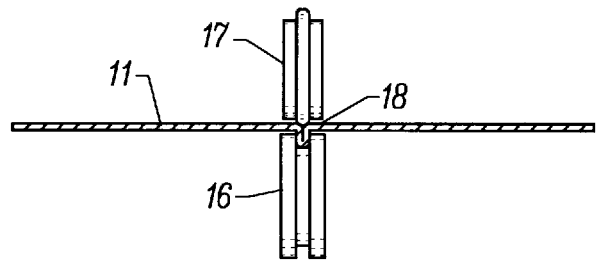
FIG. 13 is a detail view of the third forming roll for a single ribbed pipe.
Figure 12:
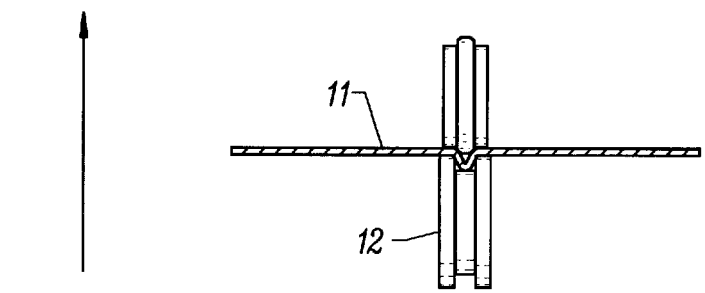
FIG. 12 is a detail view of the second forming roll for a single ribbed pipe.
Figure 11:
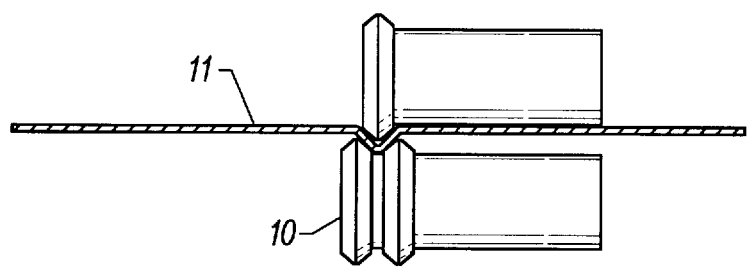
FIG. 11 is a detail view of the first forming roll for a single ribbed pipe.
Figure 16:
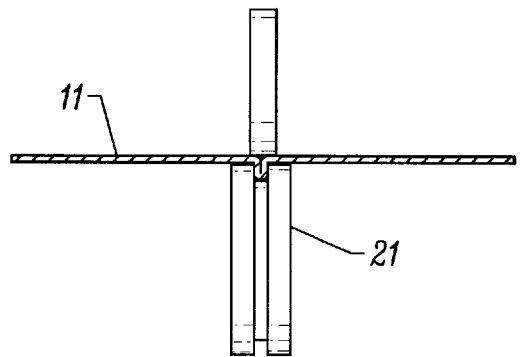
FIG. 16 is a detail view of the sixth forming roll for a single ribbed pipe.
Figure 15:
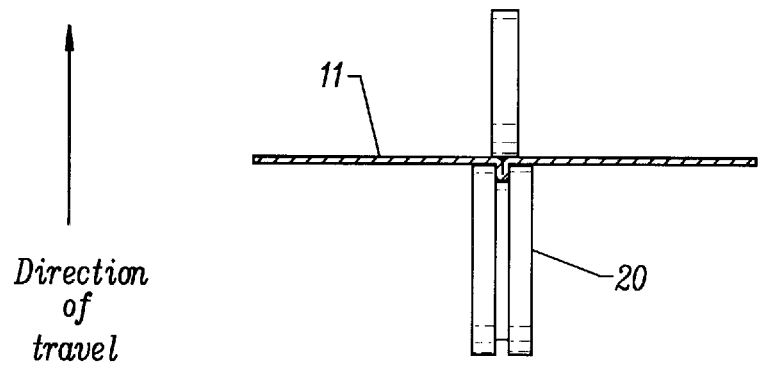
FIG. 15 is a detail view of the fifth forming roll for a single ribbed pipe.
Figure 14:
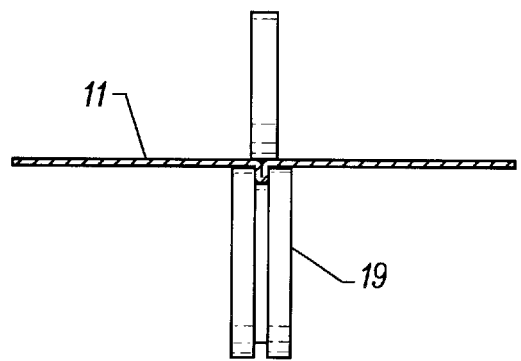
FIG. 14 is a detail view of the fourth forming roll for a single ribbed pipe.
Figure 19:
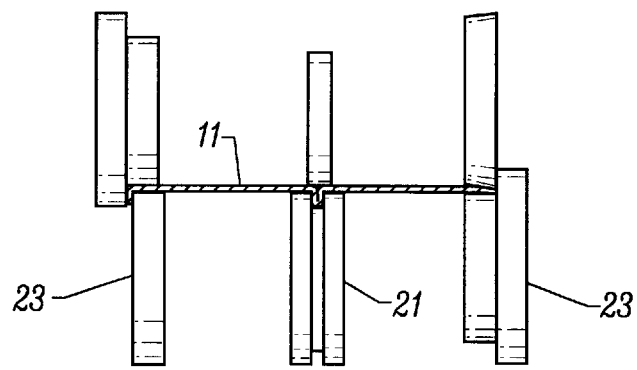
FIG. 19 is a detail view of the tenth forming roll for a single ribbed pipe, including the lock seam forming rolls.
Figure 18:
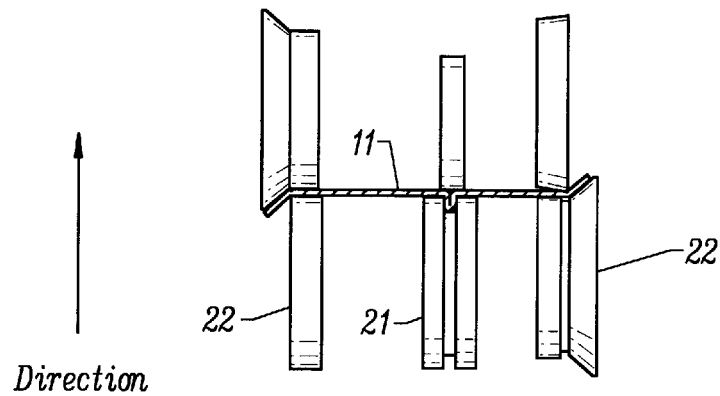
FIG. 18 is a detail view of the ninth forming roll for a single ribbed pipe, including the lock seam forming rolls.

FIG. 9 shows a side view of the triple-ribbed pipe 6, with lock seams 7 and ribs 8. FIG. 10 shows an internal section view of the triple-ribbed pipe 6. Here, the ribs 8 and the lock seam 7 are shown.

The process of making this type of ribbed pipe 1 is novel. Unlike the prior art pipes, which all have an open rib design, the instant invention has completely closed ribs. The use of closed ribs versus open ribs is not a matter of design choice. In the pipe forming art, ribs or corrugations in pipe are formed on roll forming stations. In the prior art of ribbed pipes, the ribs are formed as the metal passes over the stations, where the dies form the ribs from the inside out. An example of this technology is shown in U.S. Pat. No. 4,791,800 to Alexander. In that patent, Alexander teaches use of roll forms to create a rectangular rib in pipe. That rib is open and the formation of that rib uses a die on the inside of that pipe to hold the ribs open.

Closed-rib pipes provide the same or similar strength characteristics to open-ribbed pipes. However, the closed-ribbed pipes eliminate the space between the rib walls, which is a potential breeding ground for bacteria. Moreover, closed-ribbed pipes present a smooth wall surface as compared to open wall pipes. The difference helps to improve flow efficiency in the closed rib pipes.

Unlike the prior art, the method for forming closed-rib pipes differs in one major respect: once the initial forming bends have been made from the inside, the flange on the roll form must not protrude into the interior wall so that the rib can be closed with reasonable square shoulders.

To do this, a number of unique of forming rolls are created, through which the steel sheet 11 passes. Referring now to FIGS. 11–19 for a single-rib, the formation follows these steps: first, the sheet 11 passes through the first roll stand, a "V" former 10 (FIG. 11) where the sheet 11 is bent to form a center "V" with each leg of the "V" having the proper length to form one side of the flange or rib. The second stand, a narrow "V" former 12 (FIG. 12) deepens the center "V", draws the corners together and breaks the shoulders of the bent steel 11 (the shoulders become the base of the flange). The center V is guided between rolls at the third stand, a wide rib former, 16 (FIG. 13) by a flat roll 17 on the top, which holds the sheet down, while the bottom of the rib flange enters a slot and is followed by the rib flange walls into the slot 18. Because the slot is only three sheet thicknesses wide, the rib flange is fully formed at this stand. However, the rib flange is not closed at this point.

Figure 17:
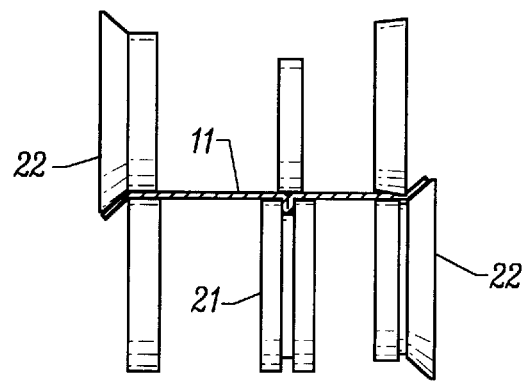
FIG. 17 is a detail view of the eighth forming roll for a single ribbed pipe, including the lock seam forming rolls.
Figure 22:
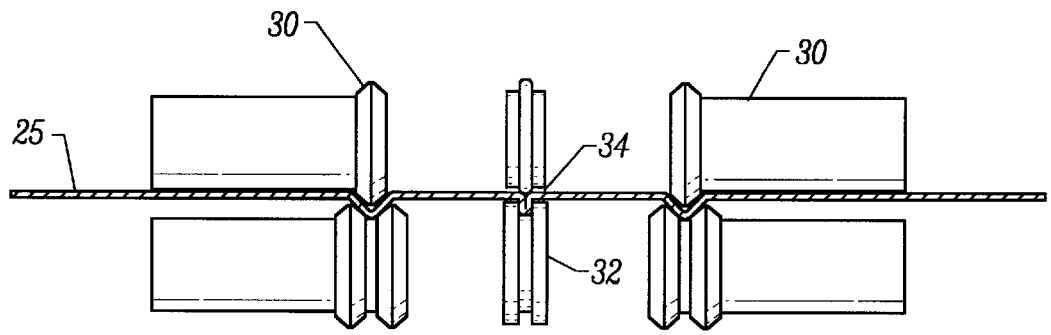
FIG. 22 is a detail view of the third forming roll for a triple ribbed pipe.
Figure 21:
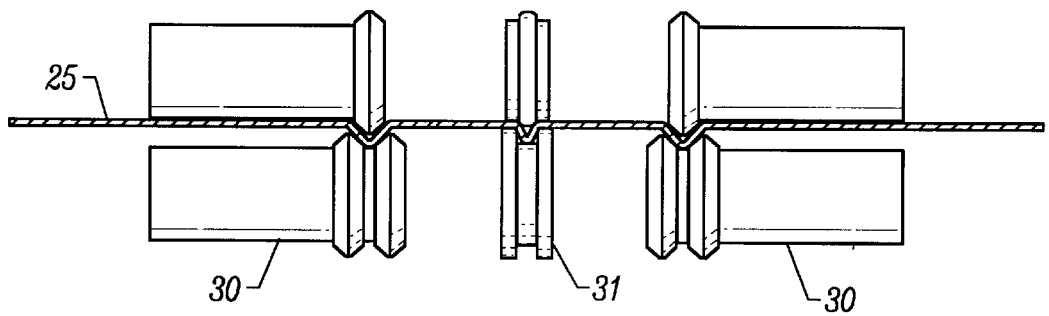
FIG. 21 is a detail view of the second forming roll for a triple ribbed pipe.
Figure 20:
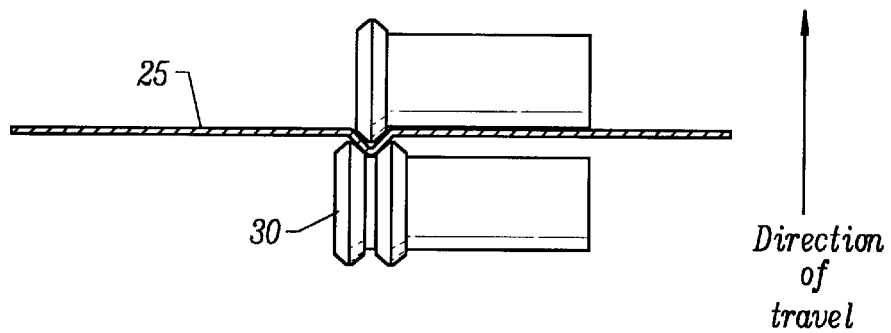
FIG. 20 is a detail view of the first forming roll for a triple ribbed pipe.
Figure 24:
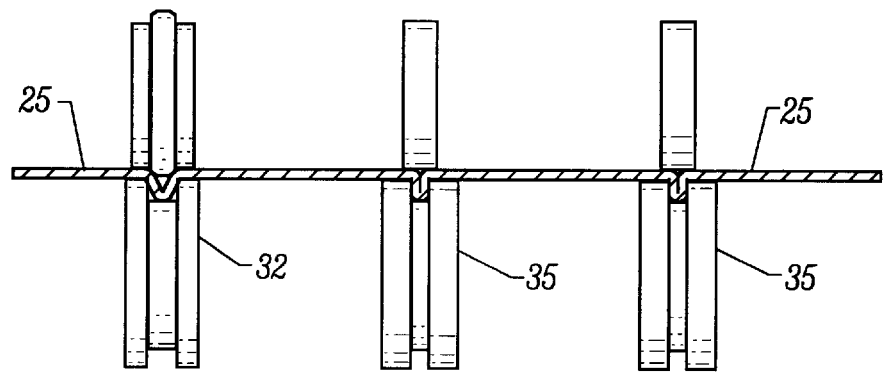
FIG. 24 is a detail view of the sixth forming roll for a triple ribbed pipe.
Figure 23:
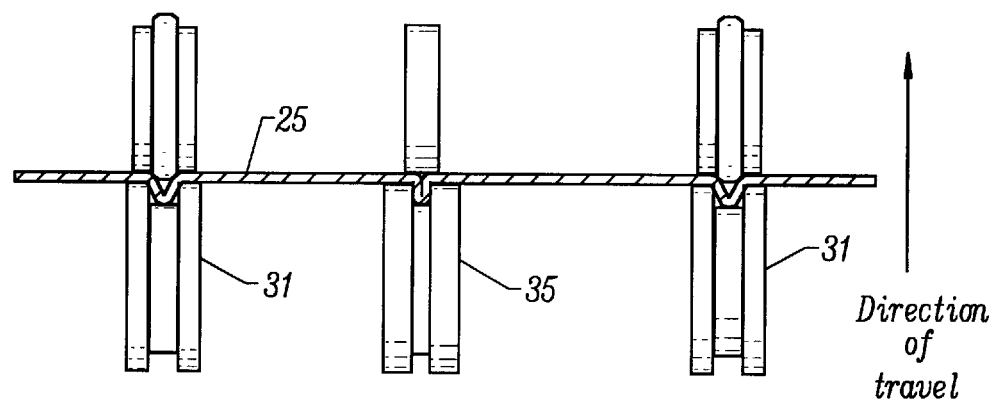
FIG. 23 is a detail view of the fifth forming roll for a triple ribbed pipe.

Between the third and fourth stands, the rolls are set closer to squeeze the base of the rib flange together. The fourth stand 19 (FIG. 14), the fifth stand 20 (FIG. 15), the sixth stand 21 (FIG. 16) and the seventh stand, which is not shown because it is identical to the sixth stand, are narrow rib formers. These stands close the rib and maintain the rib shape through the end of the process. The eighth through the tenth stands use the rib forming rolls, e.g., 21, used in the previous stands (such as in FIG. 16) to hold the flange in an upright position through a center slot. The lock seam is formed at the eighth through tenth stands. The eighth stand has two seam forming rolls 22 and a center roll 21 (FIG. 17). The ninth stand, shown in FIG. 18, uses an identical set of forming rolls, 21 and 22, as in the eighth step. The tenth stand, shown in FIG. 19, uses the scam forming rolls 23 and the center roll 21. The lock seam forming rolls and techniques for using them, are common to the pipe making art and will not be amplified here.

After stand 10, the sheet is rolled on the curving roller and joined at the lock seam in the manner common to the art.

As an alternative, a welded seam can also be made. FIGS. 7 and 8 show the weld seam 9 for both the single-rib pipe 1 and the three-rib pipe 6. The weld seam 9 is a vertical flange that buts up against the adjacent flange. The pipe can be welded at this seam using welding techniques know in the art.

Referring now to FIGS. 20–28, the forming rolls for the three-rib (flange) pipe are shown. Construction here follows a similar path as the single-rib pipe. Additional forming rolls are added, however, to form the additional ribs. Here, as in the case of the single-rib pipe, the sheet 25 passes through roll stand number one, a "V" former 30 (FIG. 20) where the sheet is bent to form a center "V" with each leg of the "V" having the proper length to form one side of the flange or rib. At stand number two, (FIG. 21), a narrow "V" forming roll 31, deepens the center "V" of the initial rib, draws the corners together and breaks the shoulders (the shoulders become the base of the flange) as in the case of the single-rib construction. At the same time, two additional "V" forming rolls 30 are used to begin the formation of the outer ribs. The "V" forming rolls 30 in this stand are kept loose to allow the outer ribs to be brought up gently at first. It is important to note that the three-rib process must go more slowly than the single-rib process because the steel must not be pulled in too quickly. Breaking and forming the steel must be done gradually. As before, at the third stand (FIG. 22), the center "V" is guided between a wide rib former 32, which has a flat roll 33 on the top, which holds the sheet down, while the bottom of the flange enters a slot 34 and is followed by the flange walls into the slot. At stand three, two more "V" forming 30 rolls continue to form the outer ribs. Stand four is not used in this process. At stand 5, shown in FIG. 23, the material for the outer ribs is gathered using the narrow "V" forming rolls 31 as shown. The center rib is supported by a rib forming roll 35 as shown.

The outer flanges are further formed at stand six (FIG. 24) by using two rib formers 35 to begin to form the shoulders of two of the ribs. The left rib is held steady in a narrow "V" former 32. Here, the third forming roll could be a rib former 35. However, it is preferred to leave the narrow "V" former 32 at one end, as shown, to ease the metal forming.

Figure 26:
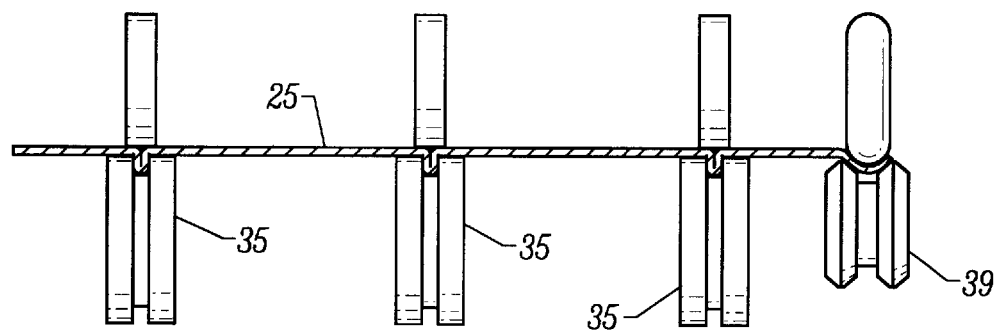
FIG. 26 is a detail view of the eighth forming roll for a triple ribbed pipe, including the lock seam forming rolls.
Figure 25:
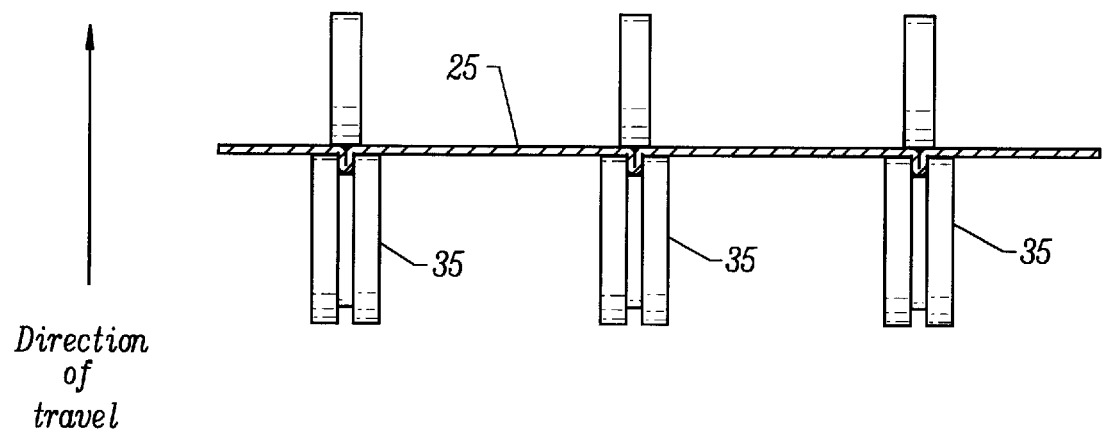
FIG. 25 is a detail view of the seventh forming roll for a triple ribbed pipe, including the lock seam forming rolls.
Figure 28:
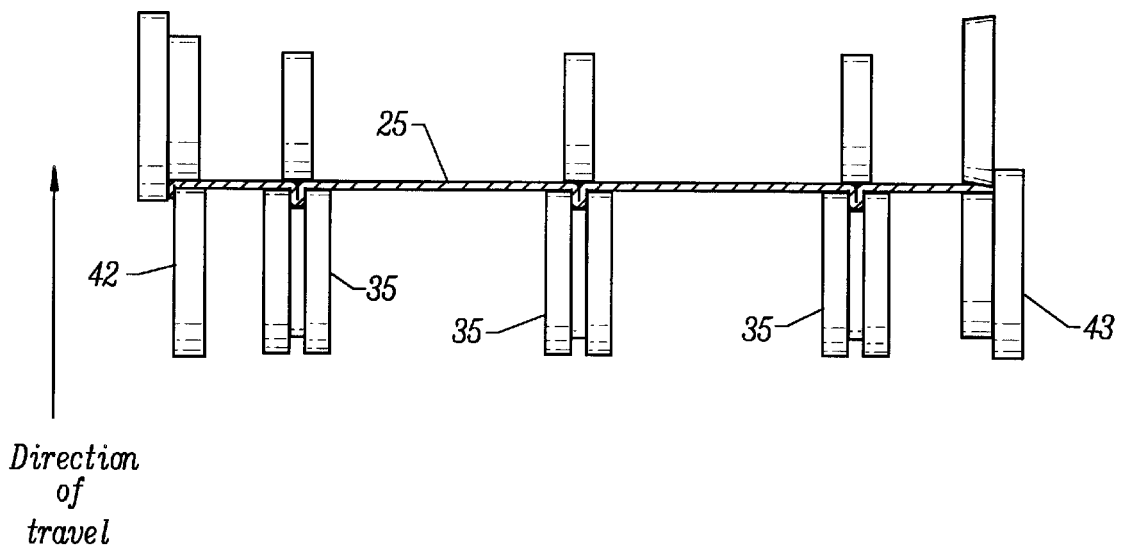
FIG. 28 is a detail view of the tenth forming roll for a triple ribbed pipe, including the lock seam forming rolls.
Figure 27:
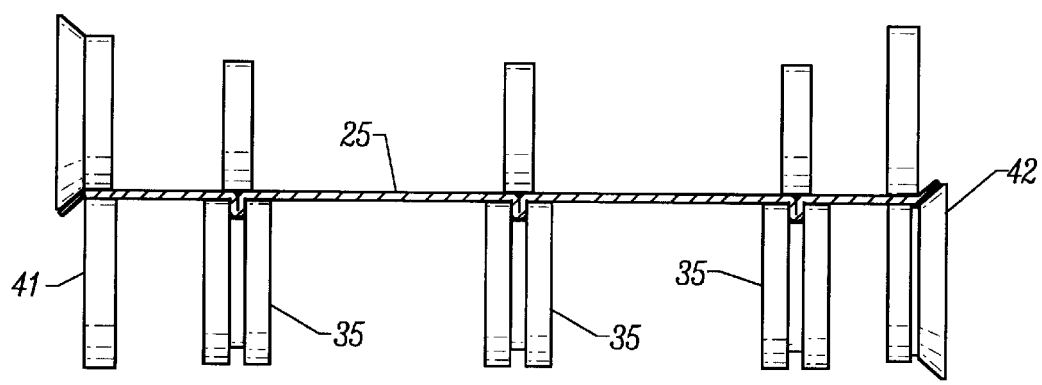
FIG. 27 is a detail view of the ninth forming roll for a triple ribbed pipe, including the lock seam forming rolls.

At stand seven (FIG. 25) the ribs are formed and held using rib formers 35 for all ribs. Stand eight (FIG. 26) is a repeat of stand seven and is used to further refine and support the ribs. The pipe is finished using rib formers rolls 35 to close and hold the ribs on stands 8 through 10 (FIGS. 26–28). As in the case of the single rib, the lock seam is formed at stands eight, nine and ten using techniques common to the art and seam forming rolls 39, 40 and 41 as shown. Once the pipe has been formed, it is rolled and seamed using techniques know in the art. One key problem in rolling the pipe is keeping the ribs straight and perpendicular. An external die is used to hold the ribs in their proper position using techniques common to the art. Such dies are commonly used in angle forming rolls and the techniques are similar and well known in the art.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. The method of forming a smooth flow metal pipe having a pipe wall including a substantially cylindrical wall, having an inner surface, said pipe wall also including a plurality of outer, integral reinforcing ribs spirally around the outer wall, whereby said plurality of reinforcing ribs are closed, said smooth flow metal pipe also having a means for joining the pipe wall into a continuous length of pipe, comprising the steps of:

a) running a flat sheet of metal through a ten stand forming roll machine, each stand having a left, right and center position, including:
      i) a "V" former roll at stand 1,
      ii) a narrow "V" forming roll in the center position, plus one "V" forming roll in the left position and one "V" forming roll in the right position at stand 2,
      iii) a wide rib former in the center position plus one "V" forming roll in the left position and one "V" forming roll in the right position at stand 3,
      iv) a rib forming roll in the center position plus one narrow "V" forming roll in the left position and one narrow "V" forming roll in the right position at stand 5,
      v) a rib forming roll in the center position, a rib forming roll in the right position and a narrow "V" forming roll at stand 6,
      vi) a rib forming roll at the center, right and left positions of stand 7 for closing said plurality ribs formed on said smooth flow metal pipe,
      vii) a rib forming roll at the center, right and left positions of stand 8,
      viii) a rib forming roll at the center, right and left positions, plus a seam forming roll at stand 9, and
      ix) a rib forming roll at the center, right and left positions, plus a seam forming roll at stand 10; and
   b) closing said closeable seam, thereby forming said smooth flow metal pipe.

2. The method of claim 1 wherein said closeable seam comprises a lock seam.

3. The method of claim 1 wherein said closeable seam comprises a weld seam.

4. The smooth flow metal pipe of claim 1 wherein the number of spiral ribs for on said smooth flow metal pipe is three.

5. The smooth flow metal pipe of claim 1 wherein said inner surface of said pipe being smooth and having no openings in said inner surface.

6. The smooth flow metal pipe of claim 1 wherein said spiral ribs extend outward from said pipe and are perpendicular to the outer wall of said pipe.

7. The smooth flow metal pipe of claim 1 wherein the reinforcing ribs extend to a height of between 0.5 and 1.0 inches.

8. The method of helically forming a smooth flow metal pipe having a pipe wall including a substantially cylindrical wall, having an inner surface, said pipe wall also including an outer, integral reinforcing rib spirally around the outer wall, whereby said reinforcing rib is closed, said smooth flow metal pipe also having a means for joining the pipe wall into a continuous length of pipe, comprising the steps of:

a) running a flat sheet of metal through a ten stand forming roll machine including:

i) a "V" roll former at stand 1, ii) a narrow "V" roll former at stand 2, iii) a wide rib roll former, at stand 3, iv) a narrow rib roll former at stands 4, 5 and 6, for forming and closing the rib on said smooth flow metal pipe, and v) a narrow rib roll former plus seam roll formers at stands 8, 9 and 10, thereby forming a closeable seam; and b) closing said closeable seam, thereby forming said smooth flow metal pipe.

9. The method of claim 8 wherein said closeable seam comprises a lock seam.

10. The method of claim 8 wherein said closeable seam comprises a weld seam.

\* \* \* \* \*

UNITED STATES PATENT AND TRADEMARK OFFICE
CERTIFICATE OF CORRECTION

PATENT NO. : 5,768,928
DATED : June 23, 1998
INVENTOR(S) : CARSON

It is certified that error appears in the above-identified patent and that said Letters Patent is hereby corrected as shown below:

Claim 1, column 6, line 16, immediately following "method of" insert --helically--.

Signed and Sealed this

Second Day of March, 1999

Attest:

Q. TODD DICKINSON

*Attesting Officer*     Acting Commissioner of Patents and Trademarks